US011783318B2

(12) United States Patent
Rule et al.

(10) Patent No.: US 11,783,318 B2
(45) Date of Patent: Oct. 10, 2023

(54) SYSTEM AND METHOD ENABLING MOBILE NEAR-FIELD COMMUNICATION TO UPDATE DISPLAY ON A PAYMENT CARD

(71) Applicant: Capital One Services, LLC, McLean, VA (US)

(72) Inventors: Jeffrey Rule, Chevy Chase, MD (US); Colin Hart, Arlington, VA (US); Kevin Osborn, Newton, MA (US); Rajko Ilincic, Annandale, VA (US)

(73) Assignee: Capital One Services, LLC., McLean, VA (US)

( * ) Notice: Subject to any disclaimer, the term of this patent is extended or adjusted under 35 U.S.C. 154(b) by 0 days.

(21) Appl. No.: 17/675,277

(22) Filed: Feb. 18, 2022

(65) Prior Publication Data
US 2022/0245620 A1    Aug. 4, 2022

Related U.S. Application Data

(62) Division of application No. 16/600,940, filed on Oct. 14, 2019, now Pat. No. 11,288,659, which is a (Continued)

(51) Int. Cl.
*G06Q 20/34* (2012.01)
*G06Q 20/32* (2012.01)

(52) U.S. Cl.
CPC ....... *G06Q 20/354* (2013.01); *G06Q 20/3278* (2013.01); *G06Q 20/341* (2013.01)

(58) Field of Classification Search
CPC . G06Q 20/354; G06Q 20/341; G06Q 20/3278
(Continued)

(56) References Cited

U.S. PATENT DOCUMENTS

2016/0180306 A1* 6/2016 Koeppel .......... G06Q 20/40145
 705/41
2017/0109730 A1* 4/2017 Locke .................... G06K 19/02
(Continued)

OTHER PUBLICATIONS

MasterCard (MA) issued patent titled "Systems and methods for pre-authenticating a user of a payment card over a network" News Bites US—NYSE [Melbourne] Aug. 4, 2022. (Year: 2022).*

*Primary Examiner* — William E Rankins
(74) *Attorney, Agent, or Firm* — KDW FIRM PLLC

(57) ABSTRACT

Disclosed are a system and methods enabling updating of a card number of a payment card and thereby reissuing the payment card utilizing a reissue application associated with the payment card. The reissue application, when executed communicates with a service provider that manages the payment card. The payment card includes processing circuity and a rewriteable visual display. Using cryptographic techniques, the reissue application and payment card are authenticated to the service provider. Upon verification, an updated card number is obtained and provided via near-field communication to the payment card. In response to the update payment card number received from the reissue application, the rewriteable visual display on the payment card is updated with the updated card number. Other information may also be presented on the rewriteable visual display of the payment card based on user preferences.

20 Claims, 7 Drawing Sheets

Related U.S. Application Data division of application No. 16/506,973, filed on Jul. 9, 2019, now Pat. No. 10,713,649.

(58) Field of Classification Search
USPC .................................................. 705/35, 41
See application file for complete search history.

(56) References Cited

U.S. PATENT DOCUMENTS

2018/0189788 A1* 7/2018 Lacoss-Arnold ........................... G06Q 20/3223
2019/0139024 A1* 5/2019 Bakshi .................. H04W 12/72

* cited by examiner

SYSTEM AND METHOD ENABLING MOBILE NEAR-FIELD COMMUNICATION TO UPDATE DISPLAY ON A PAYMENT CARD

CROSS-REFERENCE TO RELATED APPLICATIONS

This application is a divisional application of U.S. patent application Ser. No. 16/600,940 filed on Oct. 14, 2019, which is a divisional application of U.S. patent application Ser. No. 16/506,973 filed on Jul. 9, 2019 (issued as 10,713,649 on Jul. 14, 2020). The contents of the aforementioned patent and patent applications are incorporated herein by reference in their entireties.

BACKGROUND

Payment cards, such as credit cards, gift cards and debit cards, have become a preferred payment method in transactions. The number of transactions involving payment cards is increasing at an incredible rate. The number of fraudulent transactions is also increasing at an incredible rate. As a result, the number of payment cards that must be replaced is increasing as well. A payment card may have once been an inexpensive item, but with the security features required today the cost of a payment card is not trivial. The cost is particular high to card issuers when multiplied by the many card replacements that occur every year.

SUMMARY

Disclosed is a method including a step of sending, via a mobile device, a request to update a card number on a payment card to be reissued. The request may include an indication that a card number presented on a display of the payment card and encoded on a magnetic strip of the payment card is invalid and unusable. In response to the sent request, the mobile device may receive an authorization to reissue the card and update the card number. In response to the received authorization, an updated card number may be obtained from a secure source of updated card numbers. In response to command signals from a reissue application executing on the mobile device, an updated card number signal representing the updated card number may be output via a near-field communication circuit in the mobile device. In response to outputting the updated card number signal, a signal indicating that updating of the card number was successful is received via a near-field communication circuit in the mobile device.

Disclosed is another method that includes emitting, by a near-field communication device of a payment card, an authentication signal for receipt by a near-field communication device of a mobile device. The emitted authentication signal includes a card number currently displayed on the payment card. The emitted authentication signal may be emitted after the payment card is introduced into any portion of a near-field communication electric field surrounding the mobile device. The emitted authentication signal may be an approval of a request to change the card number currently displayed on a visual display of the payment card. While the payment card remains within any portion of the near-field communication electric field surrounding the mobile device, the method may include receiving, by a near-field communication device of the payment card, an updated card number signal. The updated card number signal may contain an updated card number. In response to receiving the updated card number signal, the card number currently displayed on the visual display of the payment card may be replaced with the updated card number.

Disclosed is an example of a system including a reissue application on a mobile device, an authentication server, and a payment card. The reissue application may be executable by a processor of the mobile device and when executed is operable to reissue a card number of the payment card. The authentication server is operable to communicate with the reissue application. The payment card may include a payment card near-field communication device, a rewriteable visual display, a processor, and a memory. The rewriteable visual display of the payment card may be operable to present a prior-issued card number. The reissue application, when executed may be operable to send a request to the authentication server to verify that the reissue application is associated with the payment card. In response to a verification that the reissue application is associated with the payment card, the reissue application may obtain an updated card number. The updated card number is different from the prior-issued card number. The signal generation component of the reissue application generates an updated card number signal. The updated card number signal may further include information related to at least one of: a card verification value, an expiration date, or an issuer. The reissue application may cause the updated card number signal to be output. The payment card may be operable to receive, via the payment card near-field communication device, the updated card number signal. Based on the updated card number signal, the rewriteable visual display may be driven to present an updated card number in place of the prior-issued card number.

DETAILED DESCRIPTION

Various examples describe a system and methods that enable updating of a card number of a payment card and thereby reissuing the payment card utilizing a mobile device associated with the payment card. The mobile device hosts a reissue application that is a mobile computer application that executes on a processor of the mobile device operable to communicate with a service provider that manages the payment card. The payment card includes processing circuity and a rewriteable visual display. Using cryptographic techniques, the mobile device and payment card are authenticated to the service provider. Upon verification, an updated card number is obtained from a secure source and provided via near-field communication by the mobile device to the payment card. In response to the update payment card number received from the mobile device, the rewriteable visual display on the payment card is updated with the updated card number. Other information may also be presented on the rewriteable visual display of the payment card based on user preferences. The benefits of the disclosed examples include mobile reissuance of a payment card, reduced wait time to receive an updated card number, increased security based on security features of both the mobile device and the payment card, and other benefits that may be apparent upon review and consideration of the disclosed examples.

In the described examples, the payment card may be a contactless card of credit-card dimension including an embedded integrated circuit, a storage device and an interface that permits the card to communicate with a receiving device using a Near Field Communication (NFC) protocol. An example of contactless payment card that may be used in the disclosed examples is described in U.S. patent application(s) Ser. No. 16/205,119 filed Nov. 29, 2018 by Osborn, et. al, entitled "Systems and Methods for Cryptographic Authentication of Contactless Cards" and is incorporated herein by reference in its entirety (hereinafter the '119 Application).

Figure 1:
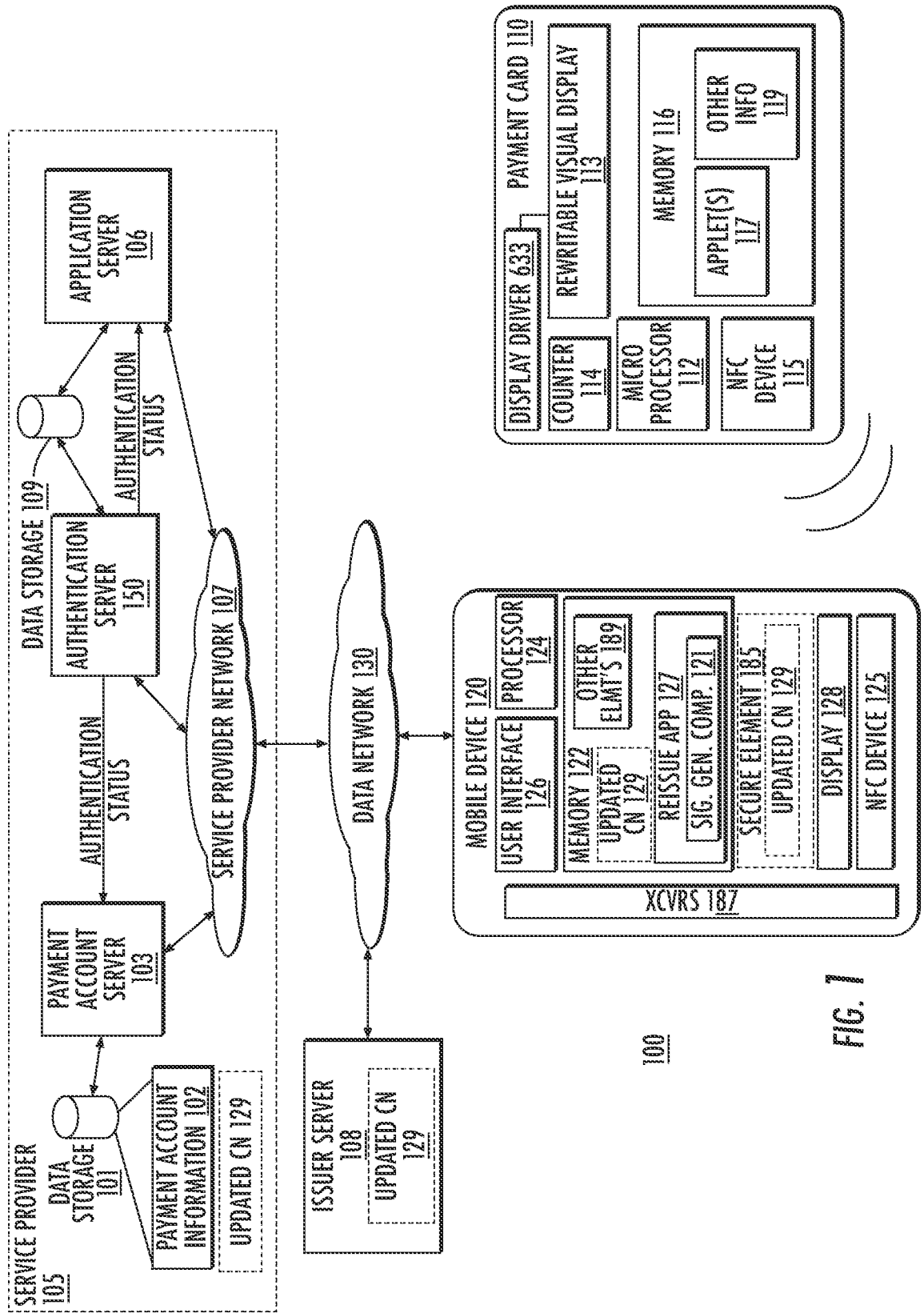
FIG. 1 is a block diagram of a system operable to reissue a payment card according to an example.

FIG. 1 is a block diagram of a system operable to reissue a payment card according to an example. The system 100 may include a service provider 105, a mobile device 120, a data network 130, and a payment card 110.

The data network 130 may be a cellular network, a wide area network (WAN), the Internet, a Wi-Fi network, or a combination of different networks. The service provider 105 may include a data storage device 101 coupled to a payment account server 103, an application server 106, a service provider network 107, and an authentication server 150. Service provider 105 may be, in one example, a business providing computer-based services to clients over a network 115. The combination of the software and hardware that provides a particular service of the service provider to a client is referred to herein as a "server." The servers may communicate over a private network of the service provider, often referred to as a service provider network 107. The service provider network 107 may comprise a wireless network, a wired network or any combination of wireless network and wired network as described above with regard to data network 130.

In the system of FIG. 1, service provider 105 is shown to include an application server 106 and an authentication server 150. Although each server is illustrated as a discrete device, it is appreciated that the applications and servers may be distributed throughout the enterprise or, in the case of distributed resources such as "cloud" resources, throughout the service provider network 107. The application server 106 may support one or more application services provided by the service provider 105, for example, an account management service. The authentication server 150, according to one aspect, may be operable to provide one or both of first factor authentication and second factor authentication using the contactless card as disclosed in more detail below.

Data storage device 109 comprises data storage resources that may be used, for example, to store customer account, credential and other authentication information, including dynamic password data, for use by the application server 106 and the authentication server 150. The data storage device 109 may be comprised of coupled data resources comprising any combination of local storage, distributed data center storage or cloud-based storage.

The service provider network 107 may be a wide area data communication network or the like, that enables the various components of the service provider 105 to communicate with one another within the service provider 105 and the data network 130 outside the service provider 105. The payment account server 103 may be coupled to a data storage device 101 and communicatively coupled to the data network 130 and the authentication server 150. The payment account server 103 may be operable to store payment account information 102 related to the payment card 110 as well as other payment cards (not shown) in data storage device 101. For example, the payment account information 102 may include at least one of: a payment account balance, payment account limits, information related to the mobile device 120, user preference information, such as user preference selections, transaction information, a payment card number history, a list of undeployed payment card numbers, information related to users authorized to use the payment card 110, or the like.

In some examples, the payment account server 103 may be operable to store the updated card number 129. For example, in response to a request from the mobile device 120, the payment account server 103 may be operable to retrieve the updated card number 129 from the data storage device 101 and send the updated card number 129 to the reissue application 127 executing on the mobile device 120.

The application server 106 may be operable to manage the operation and delivery of different applications (i.e., computer applications or programming code), such as the reissue application 127 that are executable by a processor on a mobile device, a server or another computing device. For example, a user may select an icon, link or other mechanism provided as part of the reissue application 127 to launch the application on the mobile device 120 to access payment card number reissue services. The application server 106 may maintain user preferences, user names, or similar information in a data storage (not shown) that may be similar to data storage device 101.

The authentication server 150 may include hardware and software for performing various authentication processes. The authentication server 150 is operable to communicate with the payment account server 103 and the application server 106 within the service provider 105. For example, the authentication server 150 may provide an authentication status with respect to a payment card that is having a card number reissued in response to a request from either the payment account server 103 or the application server 106. In addition, the mobile device 120 and the data network 130 are operable to exchange communications between the mobile device 120 and the authentication server 150.

In an example, the authentication server 150 may be operable to authenticate transactions made with the payment card and operations related to the payment card, such as reissuing a payment card number, authenticating account information updates, or the like. For example, the authentication server 150 may be operable to store information related to clients of the service provider 105 including a client information table (not shown). The information may also be stored in data storage device 101 and be accessible to the payment account server 103. Such information may include, but is not limited to, the client username and client cryptogram keys and counters.

The mobile device 120 may include a mobile device processor 124, a memory 122 storing a reissue application 127, transceivers (XCVRS) 187, and a near-field communication (NFC) device 125. the mobile device 120 may include a secure element 185 that may be operable to, optionally, store an updated card number 129. The reissue application 127 hosts the signal generation component 121. In examples, the reissue application 127 upon execution by the mobile device processor 124 may cause the mobile device processor 124 to be operable to cause the mobile device display 128 to present a user interface 126 that provides information related to the payment card 110 including information that associates the payment card 110 with the reissue application 127 on the mobile device 120, and enables the reissue application respond to user inputs to the user interface 126.

In more detail, the reissue application 127 may enable a user to manage a payment account, such as set authorized users, set spending limits, set and respond to purchase verification notifications, request a reissue of the payment card number, or the like, maintained by the payment account server 103 in the data storage 101. In an example, the reissue application 127 may be associated with the payment card 110 at the authentication server 150. The reissue application 127 may, for example, be provided by the service provider 105 and may be operable to link to different services and servers, such as the application server 106 and authentication server 150 as well as communicate with the payment card 110. The reissue application may include a signal generation component 121, which generates signals, such as command signals, for output to other devices, such as the service provider 105, the payment card 110, or the like.

The mobile device 120 may include at least one input device (shown in a later example) coupled to a user interface 126 and a mobile device display 128. The mobile device 120 may further include a mobile device display 128, which may, for example, be a touchscreen display suitable for providing the user interface 126, that is operable to display information in response to signals generated by the reissue application 127 executing on the mobile device 120 processor. The mobile device display 128 may be operable to display the user interface 126 that presents information in response to signals generated by the reissue application 127 executing on the mobile device 120 processor.

The mobile device processor 124, for example, may be operable to, via the reissue application 127, present via the user interface 126 on the mobile device display 128 a placement indication of where the payment card is to be placed with respect to the mobile device 120. The placement indication may indicate a placement of the payment card 110 with reference to the mobile device 120 that enables near-field communication signals to be exchanged between the mobile device near-field communication device 125 and the payment card near-field communication device. The indicated placement may, for example, align the respective electrical fields of the respective near-field communication devices of the mobile device 120 and the payment card 110 for near maximum signal strength. User preference display signal generation instructions may be information that is communicated between the mobile device 120 and the payment card 110. The user preference display signal generation instructions may be generated by the signal generation component 121 into a signal, for example, based on the information related to the selected user preferences, and may be output by the NFC device 125 as a user preference signal display to the payment card 110.

The signal generation component 121 may be hardware, software, firmware or a combination thereof, that is operable to generate signals in response to instructions from the reissue application 127 executing on mobile device processor 124. For example, the signal generation component 121 may be software that functions as part of the reissue application 127. In another example, the signal generation component 121 may be a component of the mobile device 120 related, for example, to the transceiver 187 or the mobile device processor 124, that is utilized by the reissue application 127.

In some examples, the signal generation component 121 may be coupled to, or be part of, the mobile device processor 124. In an example, the mobile device processor 124 may output user preference display signal generation instructions to the signal generation component 121. The user preference display signal generation instructions may include user preference information that is to be output by the rewriteable visual display 113 of the payment card 110. The signal generation component 121 may be operable to generate, according to the user preference display signal generation instructions, a user preference display signal. The user preference display signal, for example, may include the information related to the selected at least one of the selectable user preferences. In an example, the signal generation component may include programming code that is executed by the mobile device processor 124 to process the user preference display signal generation instructions for output as a user preference display signal. In an example, the signal generation component 121 receive instructions from the mobile device processor 124 to produce a signal for output to a payment card or another device, such as the issuer server 108, or an entity, such as service provider 105. In the case where the instructions are to be sent to the issuer server 108 or the service provider 105, the instructions may be output to a respective transceiver of the transceivers 187 for output by the mobile device 120 via the data network 130. The generated user preference display signal may be forwarded to the mobile device near-field communication device 125 for output from the mobile device 120.

In an example, the mobile device 120 may be operable to detect via the mobile device near-field communication device 125, an authentication signal emitted from the payment card near-field communication device 115. The authentication signal may be forwarded to the authentication server 150, and, in response to forwarding the authentication signal, the mobile device 120 may receive verification or authentication that the payment card 110 is a valid payment card having an authenticated association with the mobile device 120. For example, as a result of the verification or authentication, the service provider has indicated the payment card 110 is valid for use in transactions and that the association between the mobile device 120 and the payment card 110 is verified and authenticated.

The mobile device 120 may include a secure element 185. In some examples, the mobile device processor 124, when obtaining the updated card number 129, may be operable to retrieve the updated card number 129 from the secure element 185 of the mobile device. The mobile device processor 124 may report the updated card number of the payment card 110 to an issuer server 108 that is related to an issuer of the payment card. In response to reporting the updated payment, the updated card number may be deleted from the secure element 185 of the mobile device 120.

The payment card 110 may be operable to receive, via the payment card near-field communication device 115, the user preference display signal output by the mobile device 120 near-field communication device. The user preference display signal may be processed by the microprocessor 112 of the payment card 110. The processed user preference display signal may be forwarded to the display driver 633 and the rewriteable visual display 113 for output of an updated card number. The payment card near-field communication device 115 may be operable to transform the updated card number signal output by the mobile device NFC device 125 to voltage values suitable to drive the rewriteable visual display 113 (i.e., an electronic ink display in this example) to replace text and/or graphics, such as a card number, presented on the display with new text and/or graphics, such as an updated card number. The payment card 110 may include a payment card near-field communication (NFC) device 125, a display driver 633, a rewriteable visual display 113, a microprocessor 112, a counter 114, and a memory 116. The rewriteable visual display 113 of the payment card 110 may be coupled to the display driver 633 may operable to present a card number. The rewriteable visual display 113 may, for example, be an electronic ink display. The memory 116 may store applet(s) 117 and other information 119. The applets 117 may include an instance of the reissue application, such as reissue application 127, that may be obtained from the application server 106 of the service provider 105. In an example, the memory 116 may include a secure element (not shown) within the other information 119. In some examples, the payment card processor 112 may be operable to retrieve an updated card number 129 from the secure element. The counter 114 may keep a count of the number of times the payment card 110 is used in a transaction or the like. The counter 114 count number may not be shared outside of the card, which makes the counter 114 count number difficult to determine by an eavesdropping device. Details of the applet(s) 117 and other information 119 are explained in more detail with reference to the examples of FIGS. 2-5.

The payment card 110 may be a contactless card that is in wireless communication, for example, near-field communication (NFC), with the mobile device 120. Via the NFC interaction between the payment card 110 and the mobile device 120, the payment card 110 may harvest energy (described in more detail with reference to the example of FIG. 3B) from the mobile device's NFC signals to perform the functions as described herein. For example, payment card 110 may comprise one or more chips, such as a radio frequency identification chip, operable to communicate via NFC or other short-range protocols. In other examples, payment card 110 may communicate with mobile device 120 through other means including, but not limited to, Bluetooth, satellite, and/or Wi-Fi. In some examples, the mobile device may be, for example, a card reader terminal, a cellular phone, a laptop, and/or a tablet. The payment card 110 may be operable to communicate with the mobile device 120 through NFC when the payment card 110 is within range of the respective mobile device. As described in more detail below, the payment card 110 may include username, encryption key and counter information from counter 114 that may be transformed using cryptographic algorithms to generate a cryptogram including dynamic password that may be used by the service provider to authenticate the mobile device.

The system 100 may also include an issuer server 108. The issuer server 108 may be associated with an issuer (e.g., Mastercard, Visa, American Express, Discover, or the like) of the payment card 110. The issuer server 108 may be coupled to the data network 130 and be communicatively coupled to communicate with the service provider 105 and the mobile device 120. The issuer server 108 and components of the service provider 105 may cooperate with one another to provide services to the mobile device 120. In some examples, the issuer server 108 may store the updated card number 129. The mobile device processor 124 via the reissue application (app) 127 may enable the mobile device 120 to retrieve the updated card number from the issuer server 108.

Details of an operation example are described in more detail with reference to the examples of FIGS. 4 and 5. However, it may be beneficial at this time to briefly describe an operational example that explains the interaction of the respective components of the system 100 with reference to FIG. 1. In the example, the mobile device 120 may be operable to send, by the reissue application 127, a request to the authentication server 150 sent via the data network 130. The request may be made to the authentication server 150 to verify that the mobile device 120 is associated with the payment card 110. In response to a verification that the mobile device 120 is associated with the payment card 110, the mobile device 120 may obtain an updated card number (CN) 129. As shown, the updated card number may be stored in a number of different locations within the system 100. For example, the updated card number 129 may be stored in a secure location by the service provider 105 in a payment account server that is coupled to a data storage device 101. In an example, the updated card number 129 may be stored with payment account information 102. The payment account information 102 may include information related to each payment card account managed and serviced by the service provider 105. Alternatively, the issuer server 108 may store a number of unused or unassigned payment card numbers that may be used as an updated card number 129.

In the example, the updated card number 129 is different from a card number displayed on the payment card 110 prior to issuing an updated card number. The signal generation component 121 may be operable to generate an updated card number signal. The updated card number signal may, for example, include the updated card number and other related information, such as an encryption key, authorized user name(s), a card verification value, an expiration date, an issuer name, or the like. In another example, the updated card number signal may be a signal without the updated card number that instead indicates that the updated card number is to be generated by a device, such as payment card, an issuer server, or the like, that receives the updated card number signal. In a further example, a card verification value may be another identifier, such as a hash value or the like, related to the payment card 110 that may be used by, for example, the authentication server 150 to further to confirm or verify that the payment card 110 is authentic, valid or is associated with a user who also possesses the mobile device 120. The updated card number signal may be output via the mobile device near-field communication device 125. In the example, the payment card 110 may be operable to receive, via a payment card near-field communication device 115, the updated card number signal output by the mobile device near-field communication device 125. In response to receiving the updated card number signal, the microprocessor 112 may be operable to process the updated card number signal, and, based on the updated card number signal, the rewriteable visual display 113 may be driven (by display driver 633) to present the updated card number instead of the displayed card number.

Figure 2:
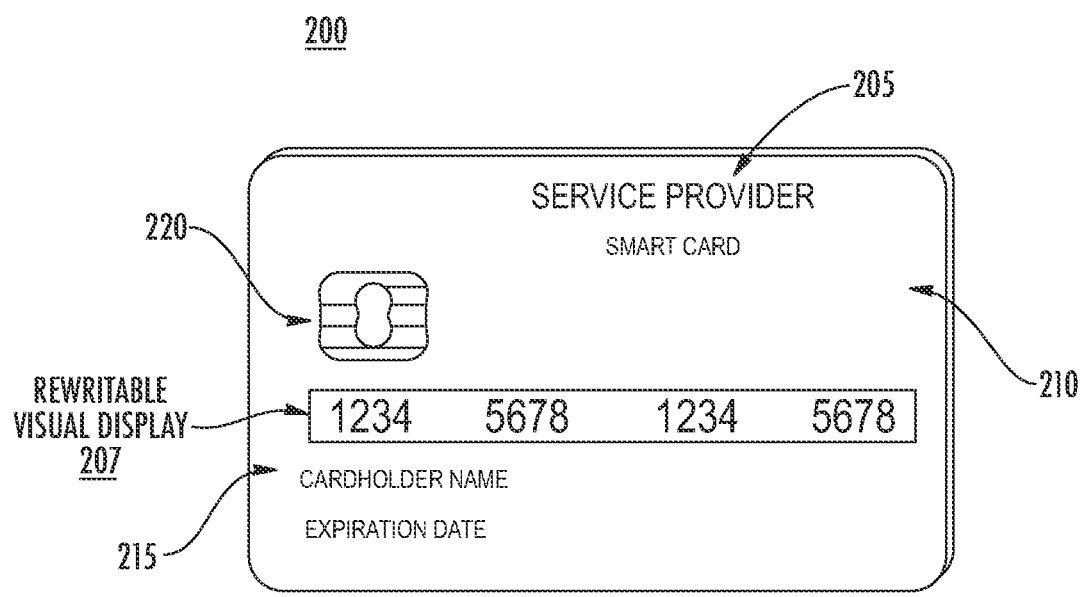
FIG. 2 is an example of a contactless card suitable for use in the system example of FIG. 1.
Figure 3A:
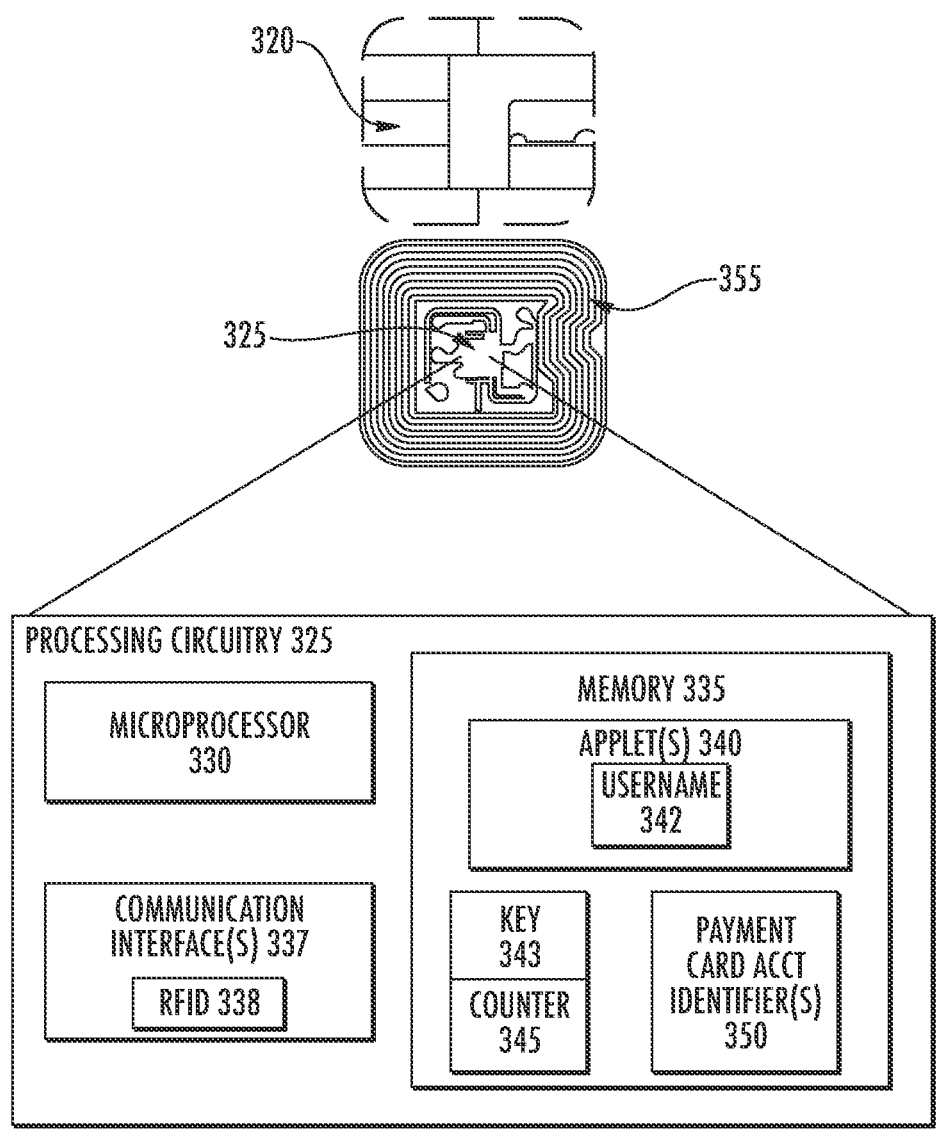
FIG. 3A is a block diagram illustrating examples of components of the contactless card of FIG. 2.
Figure 3B:
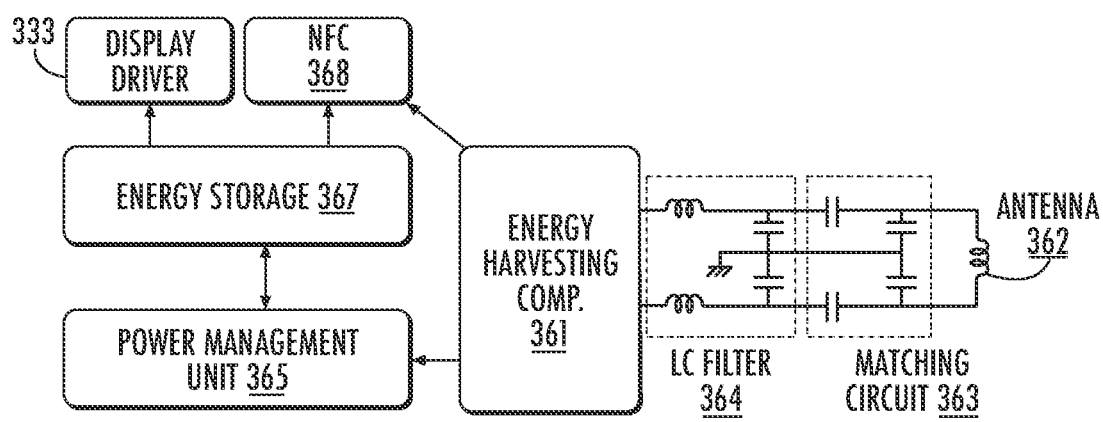
FIG. 3B illustrates an example of an apparatus that supplies power to a payment card for modifying a rewriteable visual display of a payment card example as described with reference to FIGS. 2 and 3A.

The payment card 110 may include a number of components, such as those shown in FIG. 1, but a more detailed discussion of an example of a payment card is provided with reference to FIGS. 2 and 3A-B.

FIG. 2 provides a front view of an example of a payment card 200 suitable for use in the example processes described herein. The payment card 200 may be operable as a payment card, such as a credit card, debit card, or gift card, issued by a service provider/issuer, whose name 205 is displayed on the front (or the back, in some examples) of the payment card 200. The contactless, payment card 200 may also include user identification information 215 displayed on the front and/or back of the payment card 200, a rewriteable visual display 207, and a contact pad 220 as well as the service provider/issuer name 205.

The payment card 200 may include a substrate 210, which may include a single layer, or one or more laminated layers composed of plastics, metals, and other materials. Examples of materials that may be used to form the substrate 210 include polyvinyl chloride, polyvinyl chloride acetate, acrylonitrile butadiene styrene, polycarbonate, polyesters, anodized titanium, palladium, gold, carbon, paper, biodegradable materials, and or the like. In some examples, the payment card 200 may have physical characteristics compliant with the ID-1 format of the ISO/IEC 7810 standard, and the payment card 200 may otherwise be compliant with the ISO/IEC 14443 standard. However, it is understood that the payment card 200 according to the present disclosure may have different characteristics.

The rewriteable visual display 207 may be an electronic ink display that responds to drive signals to set the state of the display, and in response to the drive signals being removed the electronic ink display remains static in the state set by the last applied drive signal. For example, an example of a currently-displayed or prior-assigned payment card number may be "1234 5678 1234 5678" as shown in the rewriteable visual display 207. The payment card 200 may also include a magnetic strip or tape, which may be located on the back of the card (not shown). As described in the following examples, the currently-displayed or prior-assigned payment card number "1234 5678 1234 5678" may be written over with an updated card number such as "0987 6543 2109 8765" or the like. As a result, the payment card with the updated card number may be reissued and used in future transactions.

In an example, the payment card 200 may include a rewriteable magnetic strip that is rewritten with the updated card number at substantially the same time that the updated card number is provided to the electronic ink display for use in future transactions.

The payment card 200 may also include user identification information 215 displayed on the front and/or back of the card, and a contact pad 220. The user identification information 215 (shown as "Cardholder Name") may be a user's name or nickname. The contact pad 220 may be operable to establish contact with another communication device, such as a mobile device, a smart phone, a laptop, a desktop, a tablet computer, or the like. The payment card 200 may also include processing circuitry, antenna and other components shown in other examples. These components may be located behind the contact pad 220 or elsewhere on the substrate 210.

As explained above, the payment card 200 may be built on a software platform operable on smart cards or other devices that comprises program code, processing capability and memory, such as JavaCard. In some examples, applets, such as 117 of FIG. 1, may be added to contactless payment cards to generate requests to reissue card numbers as well as other services, such as issuing a one-time password (OTP) for multifactor authentication (MFA) in various mobile application-based use cases. Thus, the functionality of the contactless payment card enables communication with a mobile device to reissue a payment card number as described below with reference to FIGS. 3A-5.

FIG. 3A is a block diagram illustrating examples of components of the contactless payment card of FIG. 2 in more detail.

As illustrated in FIG. 3A, underneath (and coupled to) the contact pad 320 may be processing circuitry 325 for processing and storing information and one or more antennas 355. In addition to a logic circuit and the like, it is understood that the processing circuitry 325 may, for example, contain additional components, including processors, memories, error and parity/CRC checkers, data encoders, anti-collision algorithms, controllers, command decoders, security primitives, tamper-proofing hardware, or the like as necessary to perform the functions described herein.

The one or more antennas 355 may be placed within the payment card and under contact pad 320 and around the processing circuitry of the contact pad 320. For example, the one or more antennas 355 may be integral with the processing circuitry 325, while another of the one or more antennas may be used with an external booster coil. In another example, the one or more antennas 355 may be external to the contact pad 320 and the processing circuitry. The one or more antennas 355 may also provide inductance needed to harvest power to drive, for example, the processing circuitry 325, the memory 335, the rewriteable visual display 207 of FIG. 2, and the like. The processing circuitry 325 may include a power management unit (not shown) which may be operable to manage the power supply and storage for the payment card 200.

In an example of energy harvesting, FIG. 3B illustrates an example of an apparatus 360 that supplies power to a payment card for modifying a rewriteable visual display of a payment card example as described with reference to FIGS. 2 and 3A-B. In the example apparatus 360 of FIG. 3B, the antenna 362 may be an NFC compatible antenna configured to receive NFC signals. In the example of FIG. 3B, the antenna 362 may be operable to provide both communications and the inductance needed for power harvesting. As mentioned above, the antenna 362 may be coupled to a communication interface (shown in the example of FIG. 3A) that provides the signal to processing circuitry for signal processing (as described with reference to FIG. 3A). For example, the power captured by the antenna 362 may, for example, be obtained from a 13.56 MHz NFC signal that generates an alternating current within the antenna 362. Of course, radio frequency signals of a frequency different than 13.56 MHz may also be used. The matching circuit 363 may be a part of the antenna 362 that is matched to the incoming magnetic field to produce maximum inductance. In the example, the inductive-capacitive (LC) filter 364 may act as a low pass filter, which removes high-frequency components from the received signal that are unnecessary for communication. The communication output by processing circuitry (shown in FIG. 3A).

The energy from the induced electrical current and induced voltage is harvested by the energy harvesting component 361. The induced voltage may be approximately around 0.1 volts (V). The voltage may be provided to the power management unit 365 for rectification, smoothing and other processing as well as distribution to other components, such as display driver 333 or NFC circuitry 368 that may be controlled by a microprocessor (shown in other examples). In the example, the induced voltage may power the changes on a rewriteable visual display, such as an e-ink display. If the induced voltage is too low, it may be increased using additional circuit elements and technique such as using a transformer with a greater number of turns of the coil or an increased permanent magnetic field. When the payment card is not being reissued since the e-ink display only needs to be powered when being changed, the payment card may harvest energy while being used with NFC devices and store the harvested energy in an energy storage device 367, which may be a battery, a capacitor, a supercapacitor or the like, to store power for a future change of the display. The power management unit 365 may, in a further example, include an intermediate energy storage device, such as a capacitor to smooth out the voltage provided by the energy harvesting component 361.

In the examples, signals received via the NFC antenna 362 may be used to power the NFC circuitry 368 directly or the power can be captured via the energy harvesting component 361 to drive the display driver 333, under control of a processor, to update the payment card number and present other information via changes to an e-ink display as described with reference to other examples.

Returning to the example of FIG. 3A, the memory 335 may be a read-only memory, write-once read-multiple memory or read/write memory, e.g., RAM, ROM, and EEPROM, and the processing circuitry 325 may include one or more of these memories. For example, a read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 335 may be operable to store one or more applets 340, one or more counters 345, and payment card account identifier(s) 350. The one or more applet(s) 340, one or more counters 345, and a payment card account identifier 350. The one or more applet(s) 340 may comprise one or more software applications associated with a respective one or more service provider applications (provided, for example, by service provider 105 of FIG. 1) and operable to execute on one or more payment cards, such as a Java Card applet. For example, an applet of applet(s) 340 may be operable to respond to one or more requests, such as near-field data exchange (NDEF) requests, from a reader, such as a Near Field Communication (NFC) reader, and produce an NDEF message that comprises a cryptographically secure OTP encoded as an NDEF text tag. According to an example, each applet may store a username for a user associated with the payment card account to access the associated service provider application. The one or more counters 345 may comprise a numeric counter sufficient to store an integer that, in some examples, is representative of the number of times the payment card 200 is used.

The payment card account identifier(s) 350 may comprise a unique alphanumeric identifier assigned to a user of the payment card 200 and/or one or more encryption keys that together may be used to distinguish the user of the payment card from other payment card users. In some examples, the payment card account identifier(s) 350 may include information identifying both a customer and an account assigned to that customer and may further identify the payment card associated with the customer's account. According to some aspects, the username 342 may be derived from a combination of the one or more of the payment card account identifier(s) 350 and/or one or more encryption keys 343.

For example, with reference to FIGS. 1 and 3, the memory 335 may include username 342, an encryption key 343 and counter 345 information that may be transformed by the microprocessor 330 using, for example, cryptographic algorithms to generate an encryption key including a dynamic password that may be used by the service provider's authentication server 150 of FIG. 1 to authenticate the payment card 110, the mobile device 120, a user (not shown), or all three. For example, the microprocessor 330 may use the payment card account identifier(s) 350, the encryption key 343, and a value from one of the counter 345, in cryptographic processing functionality provided by the microprocessor 330 to generate an encryption key including a dynamic password that may be used, together with the username, to authenticate a reissuing of payment card 110 and the provision of an updated card number 129 to the payment card 110 via the mobile device 120. In one example, the dynamic password relates to the counter 345. In such an example, the dynamic password thus advantageously reflects previous behaviors of the holder of the payment card 110. For example, the counter-based dynamic password may reflect the number of times that the user has used the payment card 110 to obtain a particular service (e.g., money advance, transaction authorization, or the like) of the service provider 105, which is a knowledge factor that is virtually impossible for a malicious third party to ascertain. For example, the number of times the payment card 110 is used may be stored as the counter 345 value in a secure memory of the payment card and the counter value may be incremented each time the payment card is used in a transaction.

The microprocessor 330 and memory 335 elements of the foregoing exemplary examples are described with reference to the contact pad 320, but the present disclosure is not limited thereto. It is understood that these elements may be implemented outside of the contact pad 320 or entirely separate from it, or as further elements in addition to microprocessor 330 and memory 335 elements located within the contact pad 320.

Returning to FIGS. 2 and 3A-B, in some examples, the payment card 200 may comprise one or more antennas 355 placed around the processing circuitry 325 of the contact pad 320. For example, the one or more antennas may be integral with the processing circuitry 325 and the one or more antennas 355 may be used with an external booster coil. As another example, the one or more antennas 355 may be external to the contact pad 320 and the processing circuitry 325. In an example, the one or more antennas 355 may extend around the area of the card to increase the power transfer characteristics of the antenna when placed in an electric field, such as an NFC field of a mobile device.

The processing circuitry 325 may include one or more communications interface(s) 337, such as a radio frequency identification (RFID) chip 338, coupled to the one or more antennas 355 operable to communicate with a mobile device, such as 120 of FIG. 1, via one or more short-range wireless communication protocols such as near-field communication (NFC), the Europay, Mastercard, Visa (EMV) standard, or the like, and in conformance with ISO/IEC 14443. In some examples, the RFID chip 338 may also be referred to as a payment card near-field communication device, such as 115 of FIG. 1. Although NFC is used as an example communications protocol, the disclosure is equally applicable to other types of wireless communications, such as the EMV standard, Bluetooth, and/or Wi-Fi. The RFID chip 338 may include additional components, such as those shown in the example of FIG. 3A.

The payment card account identifier(s) 350 may comprise a unique alphanumeric identifier assigned to a user of the payment card 200 and/or one or more encryption keys 343 that together may be used to distinguish the user of the payment card from other payment card users. In some examples, the payment card account identifier(s) 350 may include information identifying both a customer and an account assigned to that customer and may further identify the payment card (i.e., payment card number) associated with the customer's account. According to some aspects, the username 342 may be derived from a combination of the one or more of the payment card account identifier(s) 350 and/or one or more encryption keys 343.

In an example, the reissue of a payment card number may utilize, a password-less authentication protocol that practically applies a contactless, payment card cryptogram exchange protocol as a first factor authentication mechanism to facilitate application service access without sacrificing application service security.

The payment card cryptogram exchange protocol includes registering a payment card of a client with an application service, binding the contactless card to the client and using a cryptogram exchange protocol to perform first factor, second factor and/or other authentication of client access requests by utilizing one of the applet(s) 340, a counter value from counter 345, a key value from encryption key 343, and the microprocessor 330.

In order to insure valid authentication of a payment account, the mobile device and the payment card, the three are typically bound to one another by associating digital credentials of the payment account, the mobile device and the payment card with one another.

For example, the payment card may be registered with the service provider 105 to receive a reissue application service. As part of the registration, a username, such as 342, may be is stored in the data storage device 109 coupled to the authentication server 150. In some examples, the username may be automatically generated by the service provider 105, unknown to the mobile device, and loaded into both a user information table (not shown) stored in the data storage device 109 and an applet of applet(s) 340 downloaded on the payment card 110. As an example, the payment card is associated with a user and a user's payment account which is maintained by the payment account server 103 and stored in data storage device 101. A payment card number (e.g., 1234 5678 1234 5678), user information and user payment account information (i.e., an account number or other identifier) may be maintained and stored by the service provider 105 via the payment account server 103. The payment account information 102 also includes information regarding a mobile device associated with the user, the payment card, and the user payment account. For example, the payment account information 102 may include mobile device 120 information such as a unique identifier associated with the mobile device (e.g., a telephone number, a mobile equipment identifier (MEID), an international mobile equipment identity (IMEI), an international mobile subscriber identity (IMSI), a serial number, a media access control (MAC) address, and/or the like), application information related to an application that was used to capture the image (e.g., an identifier of an instance of the application, an application version of the application, and/or the like), and/or the like. Once the payment card is registered with the service provider 105 and bound to the mobile device, application authentication using a payment card cryptographic algorithm may be performed to enable authentication of the payment card, the mobile device and the user, which enables reissue of the payment card via the reissue application. Examples of a cryptographic algorithm suitable for use with the disclosed examples include 3DES (Triple Data Encryption Algorithm), Advanced Encryption Standard (AES); a symmetric Hash Based Message Authentication (HMAC) algorithm, such as HMAC-SHA-256; and a symmetric cypher-based message authentication code (CMAC) algorithm such as AES-CMAC, or the like. This level of security enables the following process to be executed securely, thereby mitigating concern by a service provider or payment account user of an unscrupulous person fraudulently compromising a payment card such as that as described herein.

Figure 4:
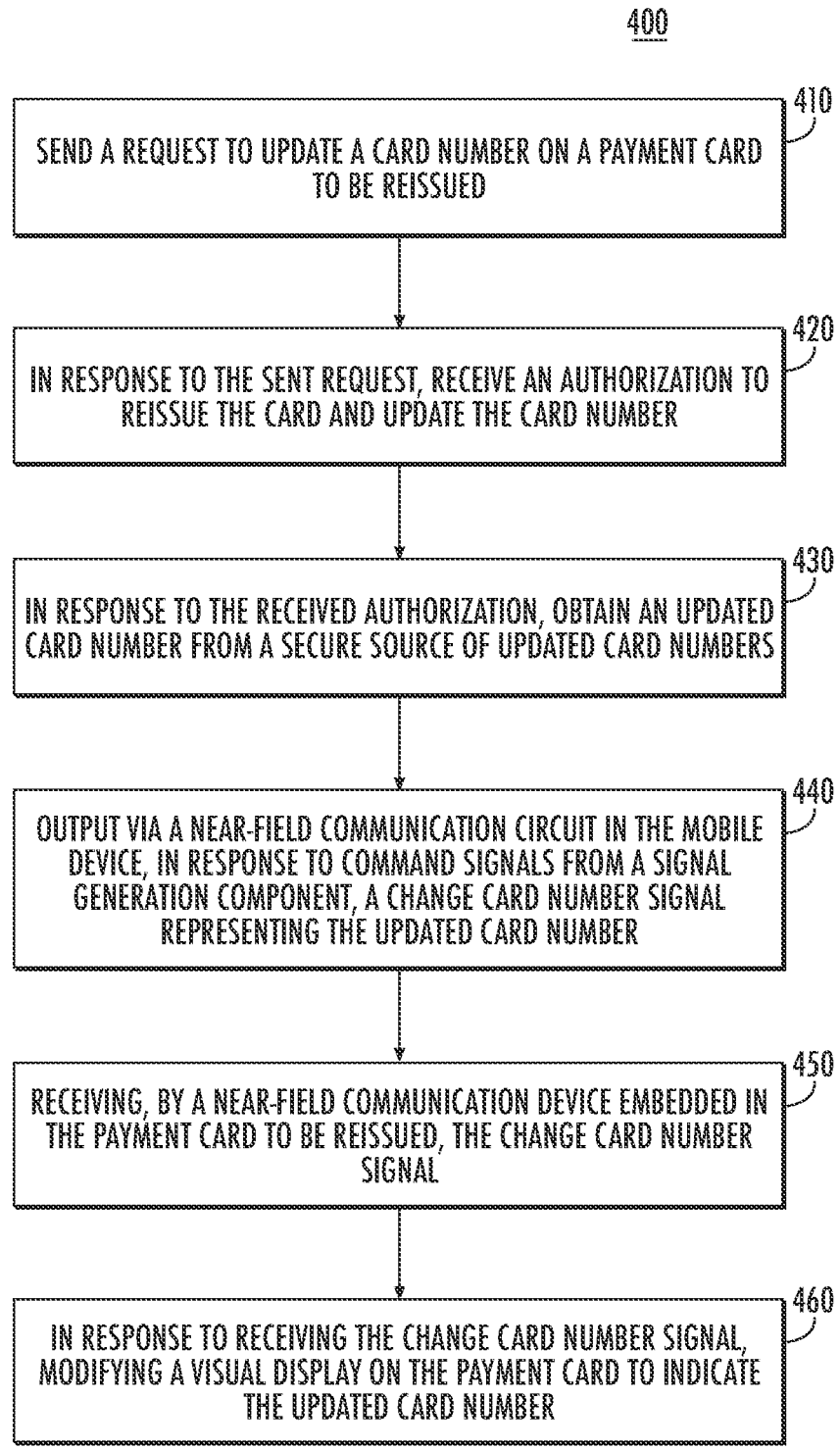
FIG. 4 is a flow chart of an example process performed by a mobile device using in a system such as that illustrated in FIG. 1.
Figure 5:
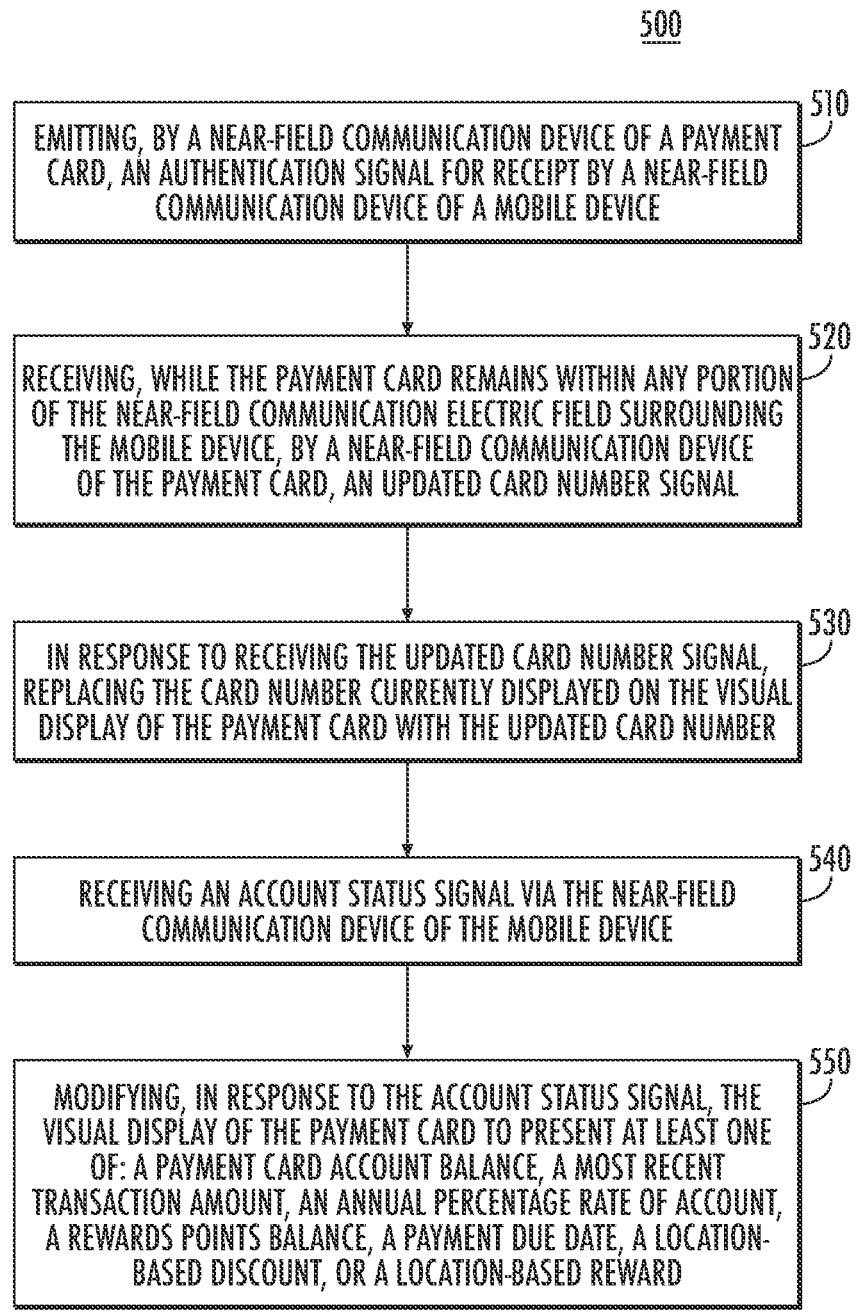
FIG. 5 is a flow chart illustrating an example of a process executed by one or more components of the system example of FIG. 1.

FIG. 4 is a flow chart of an example process performed by a mobile device using in a system such as that illustrated in FIG. 1. In an example, an e-ink display-enabled card has been compromised (e.g., fraudulent transactions have been made using the payment card number) and the payment card needs to be reissued. Instead of replacing the payment card (110 of FIG. 1 or 200 of FIG. 2), the payment card in the disclosed examples may have the number on the payment card to be changed. In the example, the payment card may be placed within an electric field of the NFC device a mobile phone (e.g. "tapped to phone") and provide information to authenticate the payment card. Based on authentication of the card and the mobile device, the mobile device is operable to pass over the new information: card number, card verification value (CVV), expiration date, service provider/issuer (e.g., VISA or MASTERCARD), all of or some of which may be displayed. For example, the e-ink display is modified, and when the payment card is removed from the NFC field of the mobile device, the e-ink display is held static.

In more detail, the process 400 may include the mobile device sending a request to update a card number on a payment card to be reissued (410). The request may include an indication that a card number presented on the display of the payment card and/or encoded on a magnetic strip of the payment card is invalid and unusable to complete a transaction (e.g., a purchase of an item or service, or the like). A payment card number may become invalid and unusable because the payment card number has been compromised by identity theft, user carelessness or the like. In some examples, prior to sending the request for authorization to reissue the payment card, an authentication message may be generated by a reissue application, such as 127 of FIG. 1, executing on the mobile device. The authentication message may, for example, include information related to the mobile device stored by an authentication server of a service provider. The authentication message may be included in the request with the indication.

In response to the sent request, the mobile device 120 may receive an authorization to reissue the payment card and update the card number (420). For example, the mobile device 120 may receive authorization to reissue the payment card and update the card number based on an authentication message included in the request. For example, the authentication message included in the request may have information, such as the encrypted messages, that is processed by the authentication server 150. An authentication status message may be sent from authentication server 150 to the payment account server 103, the application server 106 or both. In response to the authentication status message, the payment account server 103 or the application server 106 may obtain and send the updated card number and/or information associated with the selected user preferences (described in more detail below).

In this example, the card number encoded on a magnetic strip of the payment card may not be updated. In response to the received authorization, an updated card number may be obtained from a secure source of updated card numbers (430). In the example, the mobile device may obtain the updated card number by retrieving the updated card number from a secure element of the mobile device. Upon retrieving the updated card number from the secure element, the mobile device may report the updated card number of the payment card to, for example, an issuer server related to an issuer of the payment card, or a financial institution related to the payment card or the like. The mobile device may delete the updated card number from the secure element or take some other action to insure the updated card number is not inadvertently reused again. As shown in FIG. 1, the updated card number (CN) 129 may be stored in various locations and may be obtained by the mobile device 120 upon request and authorization by a respective source. For example, the secure source of the updated card numbers may, for example, be one or more a number of various sources, such as a secure element within a mobile device, a secure element within the payment card, a source within the service provider, a source within an issuer of the payment card, or another secure source. Instead of obtaining an updated card number of the secure element of the mobile device, the mobile device, when obtaining the updated card number from a secure source of updated card numbers, may retrieve the updated card number from an issuer server associated with an issuer of the payment card, such as an issuer server such as 108 in FIG. 1. In other examples, updated card numbers may be generated by a reissue application 127 of the mobile device using a cryptographic hash function based on data retrieved from the payment card 110 of FIG. 1. In another example, the processor 112 of the payment card 110 may be operable to generate an updated card number, for example, by using a cryptographic hash function or some other function and data maintained in the payment card memory, such as data from counter 114 or the like. In the example, the cryptographic hash function or other function may be secure sources of updated card numbers by using various cryptographic and other security techniques. When the payment card 110 of FIG. 1 generates the updated card number, the authentication server 150 of FIG. 1 may be used to authenticate the payment card 110 via the mobile device 120. Once authenticated, the payment card 110 itself may generate the updated card number.

In yet another example, at step 430, the mobile device 120 when obtaining the updated card number from the secure source of updated card numbers, may retrieve the updated card number from a secure element of the mobile device. The mobile device 120 may report the updated card number of the payment card to an issuer server related to an issuer of the payment card and delete the updated card number from the secure element.

In response to command signals from a signal generation component executing on the mobile device, an updated card number signal representing the updated card number may be output via a near-field communication circuit or device in the mobile device (440). With the payment card being within range of the near-field communication circuit or device in the mobile device, the near-field communication device embedded in the payment card to be reissued may receive the updated card number signal (450). In an example, the payment card may also receive an authentication signal from the mobile device 120 via the payment card near-field communication device. The logic circuit on the payment card device may verify, for example, utilizing an encryption key or the like, that the mobile device 120 is associated with the payment card.

The payment card may use the energy from the updated card number signal to supply power to a microprocessor to respond to the received signals. For example, at 460, in response to receiving the updated card number signal and harvesting energy from the received signal, a visual display on the payment card may be modified to indicate the updated card number. In an example of a payment card equipped with a rewriteable magnetic strip, the payment card microprocessor may be operable to rewrite the rewriteable magnetic strip with the updated card number. Conversely, in an example of when a payment card is not equipped with a rewriteable magnetic strip, the updated card number is different from the card number represented by the magnetic strip of the payment card to be reissued. In addition, the updated card number signal may include a value that indicates that the magnetic strip is invalid and unusable to point of sale devices that continue to use swipe technology. The payment card may store the value that indicates that the magnetic strip is invalid and unusable and provide information related to the value to the point of sale device. Alternatively, the updated card number itself may indicate the magnetic strip is invalid or the authentication server may have a setting that provides the indication to the point of sale device that the magnetic strip is invalid and unusable.

In another example, the updated card number may be a temporary payment card number, such as a temporary virtual number, usable for a single transaction, a predetermined time period, or the like. The temporary virtual number may be displayed for a limited time such as for the duration of the single transaction, the predetermined time period or the like. In another example, the rewriteable visual display may be used to display one-time use "tokens," the temporary virtual numbers, or dynamic credit card numbers. These would be provisioned by either the application server or authentication server and transmitted to the payment card via NFC of a mobile device or the like. The display may present indication that the token, temporary virtual number or dynamic credit card number is not a primary payment account number.

In some examples, the process 400 may include enable the mobile device to perform additional functions. These additional functions, for example, increase user awareness of the monetary value associated with their payment card by providing additional information that may be time consuming and inconvenient to obtain. For example, in response to a user input, the mobile device may select account display preferences for displaying information on payment card. In response to the selected account display preferences, a signal generation component of the mobile device may modify signal parameters for rewriting the rewriteable visual display according to the selected account display preferences. The modified signal parameters may be used to transmit a user preference display signal to the payment card. The transmitted user preference display signal causes a presentation of information on the visual display of the payment card, such as one or more of: a last transaction amount, a rewards total amount, an account balance, an account ceiling limit, or a warning related to account balance. Of course, other information may be provided. The presented information may be obtained from the service provider 105, for example, from the payment account server 103, the application server 106 or the like.

A payment card, such as 110 of FIG. 1, may be operable to execute a process for authentication of the card in order to receive the updated card number. FIG. 5 is a flow chart illustrating an example of a process 500 executed by the payment card of the system example of FIG. 1. In the example, at 510, a processor of the payment card may generate an authentication signal that includes a payment card number currently displayed on a visual display of the payment card. In the example, a near-field communication device of the payment card may emit the generated authentication signal for receipt by a near-field communication device of a mobile device. In the example, the emitted authentication signal may include a payment card number currently displayed on the payment card. The emitted authentication signal may be emitted after the payment card is introduced into any portion of a near-field communication electric field surrounding the mobile device. The emitted authentication signal may be an approval of a request to change, or reissue, the card number currently displayed on a visual display of the payment card. In the example, the payment card may store in a memory device within the payment card an indication that a card number encoded on a magnetic strip of the payment card is invalid and unusable.

While the payment card remains within any portion of the near-field communication electric field surrounding the mobile device, a near-field communication device of the payment card may receive an updated card number signal (520). In one example, the updated card number signal may be received from the mobile device and may contain only an updated card number. In other examples, the updated card number signal received from the mobile device may contain the updated card number as well as other information, such as information based on user selected preferences.

In a specific example, the updated card number signal may be related to a provisioning of an Europay, Mastercard, Visa (EMV) profile. In an example, EMV profiles contain authentication keys used to verify transactions with chip-based and contactless payment transactions. These authentication keys can be encrypted and sent with the card's symmetric master key (stored in the cards secure memory, such as a secure element) or done through activating backup "profiles." The backup profiles may, for example, be inactive full sets of EMV compliant-data on the chip of a payment card that become primary payment card numbers (i.e., payment card numbers that are authorized for use in transactions). On activation of a respective updated payment card number, the payment card may display the updated payment card number as a new primary account number (PAN).

In response to receiving the updated card number signal, the card number currently displayed on the visual display of the payment card may be replaced with the updated card number (530). For example, a processor or logic circuit on the payment card may, in response to receiving the updated card number signal by the near-field communication device of the payment card, generate a display drive signal for driving the visual display of the payment card to change the card number currently displayed.

The payment card may also receive, at 540, an account status signal may be received via the near-field communication device of the mobile device. In response to the account status signal, the visual display of the payment card may be modified to present at least one of: a payment card account balance, a most recent transaction amount, an annual percentage rate of account, a rewards points balance, a payment due date, a location-based discount, or a location-based reward.

The process 500 may further include selecting account display preferences for modifying information displayed on payment card. For example, the signal generation component under control of the reissue application 127 may modify signal parameters in response to the selected account display preferences. Prior to transmitting the signal representing the updated card number, a display preference signal that is based on the selected preferences may be transmitted to the payment card. The display preference signal may cause the display on payment card e-ink display of one or more of: a last transaction amount, a rewards total amount, an account balance, an account ceiling limit, or a warning related to account balance.

In other examples, the user preference display signal, in addition to the updated card number, may include information related to the selected at least one of the selectable user preferences. For example, the mobile device processor 124 of FIG. 1 may be operable, via a user interface provided by execution of the reissue application 127, to present a menu of selectable user preferences on the mobile device display 128.

In the example, the selectable user preferences in the menu may include one or more of: a payment card account balance, a most recent transaction amount, an annual percentage rate of account, a rewards points balance, a payment due date, a location-based discount, or a location-based reward. Through at least one input device (such as a touchscreen, button, keypad or the like), a selection of at least one of the selectable user preferences may be received by the mobile device 120. The at least one selected user preference may be stored in the memory. In an example, each selected user preference may be presented on the rewriteable visual display 113 of payment card 110 whenever the payment card 110 and the mobile device 120 communicate with one another, regardless of whether a payment card number is going to be reissued. The mobile device processor 124 may be further operable to, via the reissue application 127, obtain information related to the selected at least one of the selectable user preferences in response to a verification that the mobile device 120 is associated with the payment card 110. The information related to the selected at least one of the selectable user preferences may be stored in the memory 122, for example, in other elements 189, or retrieved via the authentication server 150, payment account server 103 or application server 106. The memory 122 may also be operable to store user-related numbers, information related to users authorized to use the payment card, or the like.

In another example, the payment account server 103 may be operable to retrieve the updated card number from the data storage device 101 in response to a request from the mobile device 120. The payment account server 103 may send the updated card number to the reissue application 127 executing on the mobile device.

In response to the account status signal, the visual display of the payment card may be modified to present at least one of: a payment card account balance, a most recent transaction amount, an annual percentage rate of account, a rewards points balance, a payment due date, a location-based discount, or a location-based reward (550). In some examples, prior transaction information may be stored in a memory, such as 335 of FIG. 3A. When the payment card is placed in a near-field communication electrical field, the payment card may harvest energy to present a portion of the prior transaction information.

In another example, the rewriteable visual display may be used to display one-time use "tokens" or dynamic credit card numbers. These would be provisioned by the server and transmitted to the card via NFC. There would probably be some sort of indication that it isn't the primary account number.

In addition to reissuing payment card numbers for use in future transactions, the rewriteable visual display may be controlled to change the type of card. For example, a payment card may be completely changed into another kind of card, such as a prescription card, an identity card, a debit card or the like. Of course, to provide such as change in the type of card, the service provider, such as 105 of FIG. 1, may have access to, or provide, the respective services related to a prescription card, an identity card, a debit card or the like.

Figure 6:
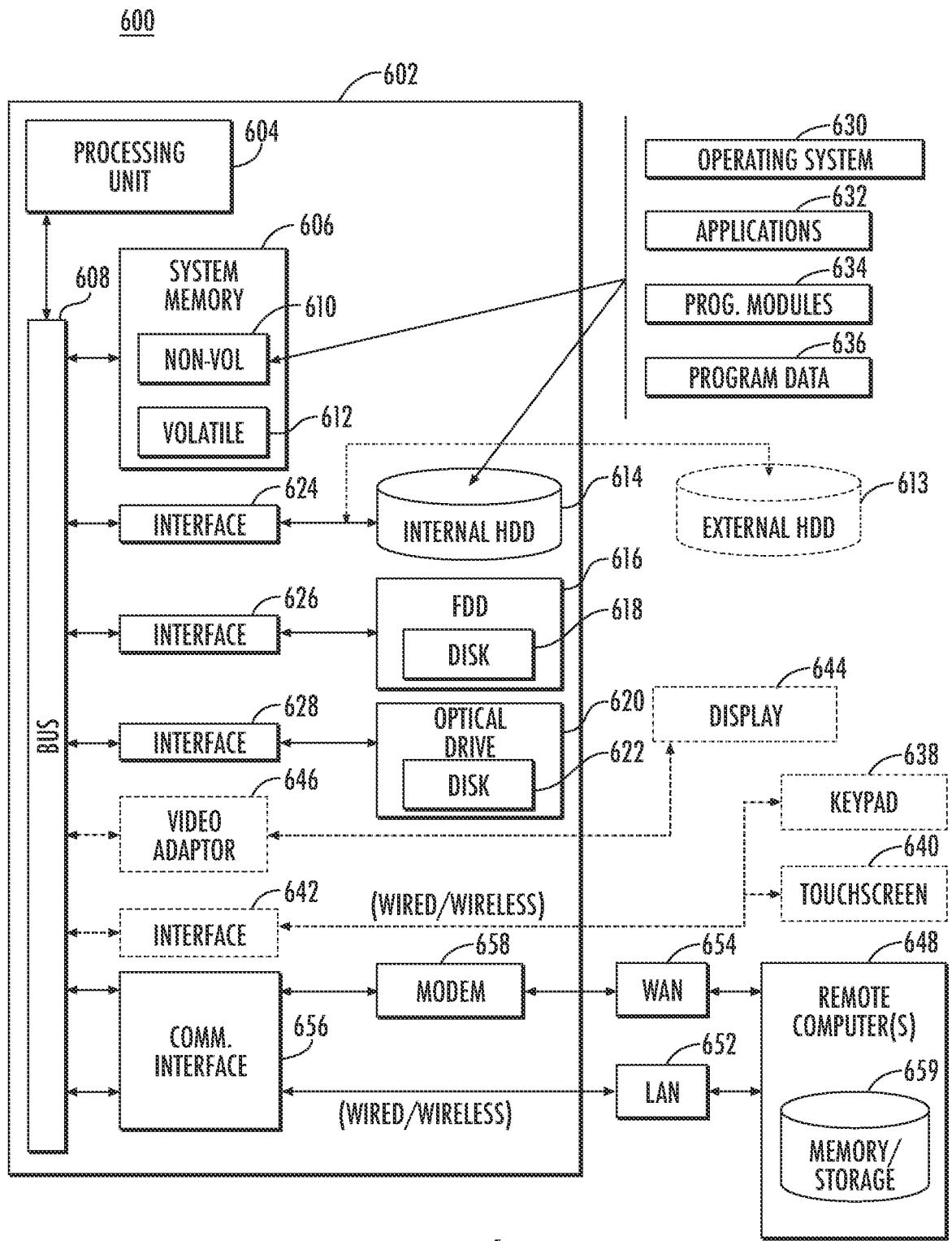
FIG. 6 illustrates a computer architecture suitable for implementing one or more components of the system example of FIG. 1.

FIG. 6 illustrates an example of a computing architecture 600 suitable for implementing various examples as previously described. In one example, the computing architecture 600 may be incorporate elements as may be typically used to implement a server or network platform, if appropriately programmed, as part of system 100. In another example, the computing architecture 600 may be incorporate optional elements that may be typically used to implement a smart digital device or a computing device that may be implemented as part of system 100.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 600.

As shown in FIG. 6, the computing architecture 600 includes a processing unit 604, a system memory 606 and a system bus 608. The processing unit 604 can be any of various commercially available processors or number of processors.

The system bus 608 provides an interface for system components including, but not limited to, the system memory 606 to the processing unit 604. The system bus 608 can be any of several types of bus structures that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Examples may also be at least partly implemented as instructions contained in or on a non-transitory computer-readable medium embodied with programming code that may be read and executed by one or more processors to enable performance of the examples of operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated example shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal hard disk drive (HDD) 614 (or, optionally, external hard disk drive (HDD) 613), a magnetic floppy disk drive (FDD) 616 to read from or write to a removable magnetic disk 618, and an optical disk drive 620 to read from or write to a removable optical disk 622 (e.g., a CD-ROM or DVD). The HDD 614 or 613, FDD 616 and optical disk drive 620 can be connected to the system bus 608 by an HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of computer program modules can be stored in the drives and memory 610, 612, including an operating system 630, one or more application programs 632, other program modules 634, and program data 636. In one example, the one or more application programs 632, other program modules 634, and program data 636 can include, for example, the various applications and/or components of the computing architecture 600. At least one computer-readable storage medium may include instructions that, when executed, cause a system to perform any of the computer-implemented methods and processes described herein.

Optionally, when configured as a mobile device, a smart digital device, a laptop or the like, the computing architecture 600 may include additional devices to enable data input and output to a user. For example, a user may enter commands and information into the computer 602 through one or more wire/wireless optional input devices, for example, a keypad 638 and a tactile input device, such as a touchscreen 640. Other input devices may include microphones, infra-red (IR) remote controls, radio-frequency (RF) remote controls, game pads, stylus pens, near-field communication devices, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 604 through optional interface 642 that is coupled to the system bus 608 but can be connected by other interfaces such as a parallel port, IEEE 1394 serial port, a game port, a USB port, an IR interface, and so forth.

Another optionally element may be display 644, which may be an organic light emitting diode (OLED), light emitting display (LED), or other type of display device, that is also connected to the system bus 608 via an interface, such as an optional video adaptor 646. The display 644 may be internal or external to the computer 602. In addition to the display 644, a computer typically includes other peripheral output devices, such as speakers, printers, and so forth which may be coupled to the system bus 608 via the optional interface 642.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all the elements described relative to the computer 602, although, for purposes of brevity, only a remote memory/storage device 659 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 may be connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the interface 642. In a networked environment, program modules depicted relative to the computer 602, or portions thereof, can be stored in the remote memory/storage device 659. It will be appreciated that the network connections shown are exemplary and other means of establishing a communications link between the computers can be used.

The computer 602 is operable to communicate with wired and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions). The wireless technologies may couple to the computer 602 via one or more transceivers (not shown) within for example the optional interface 642 or communication interface 656 that facilitate the use of the Wi-Fi, WiMax, Bluetooth wireless technologies as well as others.

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

As used in this application, the terms "system", "component" and "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

Some examples may be described using the expression "one example" or "an example" along with their derivatives. These terms mean that a particular feature, structure, or characteristic described in connection with the example is included in at least one example. The appearances of the phrase "in one example" in various places in the specification are not necessarily all referring to the same example. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure, process, or method is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more examples. Rather, the operations are machine operations. Useful machines for performing operations of various examples include general purpose digital computers or similar devices.

Some examples may be described using the expression "coupled" and "connected" along with their derivatives. These terms are not necessarily intended as synonyms for each other. For example, some examples may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various examples also relate to apparatus or systems for performing these operations. This apparatus may be specially constructed for the described purpose or it may comprise a general-purpose computer as selectively activated or reconfigured by a computer program stored in the computer. The procedures or processes presented herein are not inherently related to a particular computer or other apparatus. Various general-purpose machines may be used with programs written in accordance with the teachings herein, or it may prove convenient to construct more specialized apparatus to perform the required method steps. The structure for a variety of these machines appears from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   sending, by a mobile device, a request to update an account number on a contactless card to a service provider system;
   receiving, by the mobile device, an authorization to update the account number from the service provider system;
   requesting, by the mobile device, an updated account number from the service provider system;
   receiving, by the mobile device, the updated account number from the service provider system;
   detecting, by the mobile device, the contactless card based on wireless communication signals;
   detecting, by the mobile device, an authentication signal emitted from the contactless card;
   forwarding, by the mobile device, the authentication signal to the service provider system;
   receiving, prior to updating the account number, verification that the contactless card is a valid payment card associated with the mobile device; and
   communicating, by the mobile device, the updated account number to the contactless card.

2. The computer-implemented method of claim 1, comprising receiving, by the mobile device, a signal indicating that updating of the account number with the updated account number is successful.

3. The computer-implemented method of claim 1, wherein the request comprises information related to the mobile device stored by an authentication server of the service provider system.

4. The computer-implemented method of claim 1, wherein the mobile device comprises an application to perform operations to update the account number including sending the request, receiving the authorization, requesting the updated account number, receiving the updated account number, detecting the contactless card, and communicating the updated account number.

5. The computer-implemented method of claim 4, comprising sending, prior to requesting the updated account number, a verification request to the service provider system to verify the mobile device, the application, or both are associated with the contactless card.

6. The computer-implemented method of claim 4, comprising:
   providing, by the application, a user interface; and
   receiving, by the application, an input request via the user interface to update the account number on the contactless card.

7. The computer-implemented method of claim 4, comprising:

receiving, prior to updating the account number, verification that the contactless card is a valid payment card associated with the application.

8. A computing apparatus comprising:
a processor; and
a memory storing instructions that, when executed by the processor, cause the processor to:
send a request to update an account number on a contactless card to a service provider system;
receive an authorization to update the account number from the service provider system;
request an updated account number from the service provider system;
receive the updated account number from the service provider system;
payment card number;
detect the contactless card based on wireless communication signals;
detect an authentication signal emitted from the contactless card;
forward the authentication signal to the service provider system;
receive, prior to updating the account number, verification that the contactless card is a valid payment card associated with the computing apparatus; and
communicate the updated account number to the contactless card.

9. The computing apparatus of claim 8, comprising instructions to cause the processor to receive a signal indicating that updating of the account number with the updated account number is successful.

10. The computing apparatus of claim 8, wherein the request comprises information related to the computing apparatus stored by an authentication server of the service provider system.

11. The computing apparatus of claim 8, wherein the computing apparatus comprises an application comprising the instructions to perform operations to update the account number include sending the request, receiving the authorization, requesting the updated account number, receiving the updated account number, detecting the contactless card, and communicating the updated account number.

12. The computing apparatus of claim 11, wherein the application further comprises instructions to send, prior to requesting the updated account number, a verification request to the service provider system to verify the computing apparatus, the application, or both are associated with the contactless card.

13. The computing apparatus of claim 11, wherein the application further comprises instructions to:
provide a user interface; and
process an input request via the user interface to update the account number on the contactless card.

14. The computing apparatus of claim 11, wherein the application further comprises instructions to:
receive, prior to updating the account number, verification that the contactless card is a valid payment card associated with the the application.

15. A non-transitory computer-readable storage medium, the computer-readable storage medium including instructions, which are comprised in an application, that when executed by a processor, cause the processor to:
send a request to update an account number on a contactless card to a service provider system;
receive an authorization to update the account number from the service provider system;
request an updated account number from the service provider system;
receive the updated account number from the service provider system;
payment card number;
detect the contactless card based on wireless communication signals;
detect an authentication signal emitted from the contactless card;
forward the authentication signal to the service provider system;
receive, prior to updating the account number, verification that the contactless card is a valid payment card associated with the application; and
communicate the updated account number to the contactless card.

16. The computer-readable storage medium of claim 15, comprising the processor to receive a signal indicating that updating of the account number with the updated account number is successful.

17. The computer-readable storage medium of claim 15, wherein the instructions comprised in the application perform operations to update the account number include sending the request, receiving the authorization, requesting the updated account number, receiving the updated account number, detecting the contactless card, and communicating the updated account number.

18. The computer-readable storage medium of claim 17, comprising the processor configured to send, prior to requesting the updated account number, a verification request to the service provider system to verify the application, a device that the processor is a part of, or both, the application and the device, are associated with the contactless card.

19. The computer-readable storage medium of claim 17, comprising the processor configured to:
provide, by the application, a user interface; and
receive, by the application, an input request via the user interface to update the account number on the contactless card.

20. The computer-readable storage medium of claim 17, comprising the processor configured to:
receive, prior to updating the account number, verification that the contactless card is a valid payment card associated with a mobile device that the processor is a part of.

* * * * *

UNITED STATES PATENT AND TRADEMARK OFFICE
CERTIFICATE OF CORRECTION

| | | |
|---|---|---|
| PATENT NO. | : 11,783,318 B2 | |
| APPLICATION NO. | : 17/675277 | |
| DATED | : October 10, 2023 | |
| INVENTOR(S) | : Jeffrey Rule et al. | |

It is certified that error appears in the above-identified patent and that said Letters Patent is hereby corrected as shown below:

In the Claims

In Column 25, Claim 14, Line 58, Replace "associated with the the application" with "associated with the application".

Signed and Sealed this
Fourteenth Day of May, 2024

*Katherine Kelly Vidal*

Katherine Kelly Vidal
*Director of the United States Patent and Trademark Office*